(12) United States Patent
Wang et al.

(10) Patent No.: US 12,423,005 B1
(45) Date of Patent: Sep. 23, 2025

(54) HOST, MEMORY SYSTEM, AND OPERATION METHODS THEREOF

(71) Applicant: YANGTZE MEMORY TECHNOLOGIES CO., LTD., Wuhan (CN)

(72) Inventors: Tianyi Wang, Wuhan (CN); Mo Cheng, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/737,191

(22) Filed: Jun. 7, 2024

(30) Foreign Application Priority Data

May 30, 2024 (CN) .......................... 202410695128.8

(51) Int. Cl.
 *G06F 12/00* (2006.01)
 *G06F 3/06* (2006.01)
(52) U.S. Cl.
 CPC ............ *G06F 3/0619* (2013.01); *G06F 3/064* (2013.01); *G06F 3/0679* (2013.01)

(58) Field of Classification Search
 CPC ...... G06F 3/0619; G06F 3/064; G06F 3/0646; G06F 3/0679; G06F 11/1446; G06F 11/1471; G06F 12/0223; G06F 12/0802; G06F 12/16
 See application file for complete search history.

(56) References Cited

U.S. PATENT DOCUMENTS

2016/0124812 A1\* 5/2016 Sarkar ................ G06F 11/1435
 711/162

\* cited by examiner

*Primary Examiner* — Shawn X Gu
(74) *Attorney, Agent, or Firm* — BAYES PLLC

(57) ABSTRACT

In certain aspects, a host is disclosed. The host includes a memory configured to store instructions and a processor coupled to the memory. Responsive to execution of the instructions, the processor is configured to determine a power-up event after abnormal power-off and perform a roll-forward recovery for a memory system. A set of node blocks to be recovered is determined. For each node block included in the set of node blocks, a first data block stored in the memory system is determined based on the node block. It is determined whether first node address information retrieved from a metadata part of the first data block matches second node address information of the node block. It is determined whether to recover the node block and the first data block in the memory system based on whether the first node address information matches the second node address information.

20 Claims, 14 Drawing Sheets

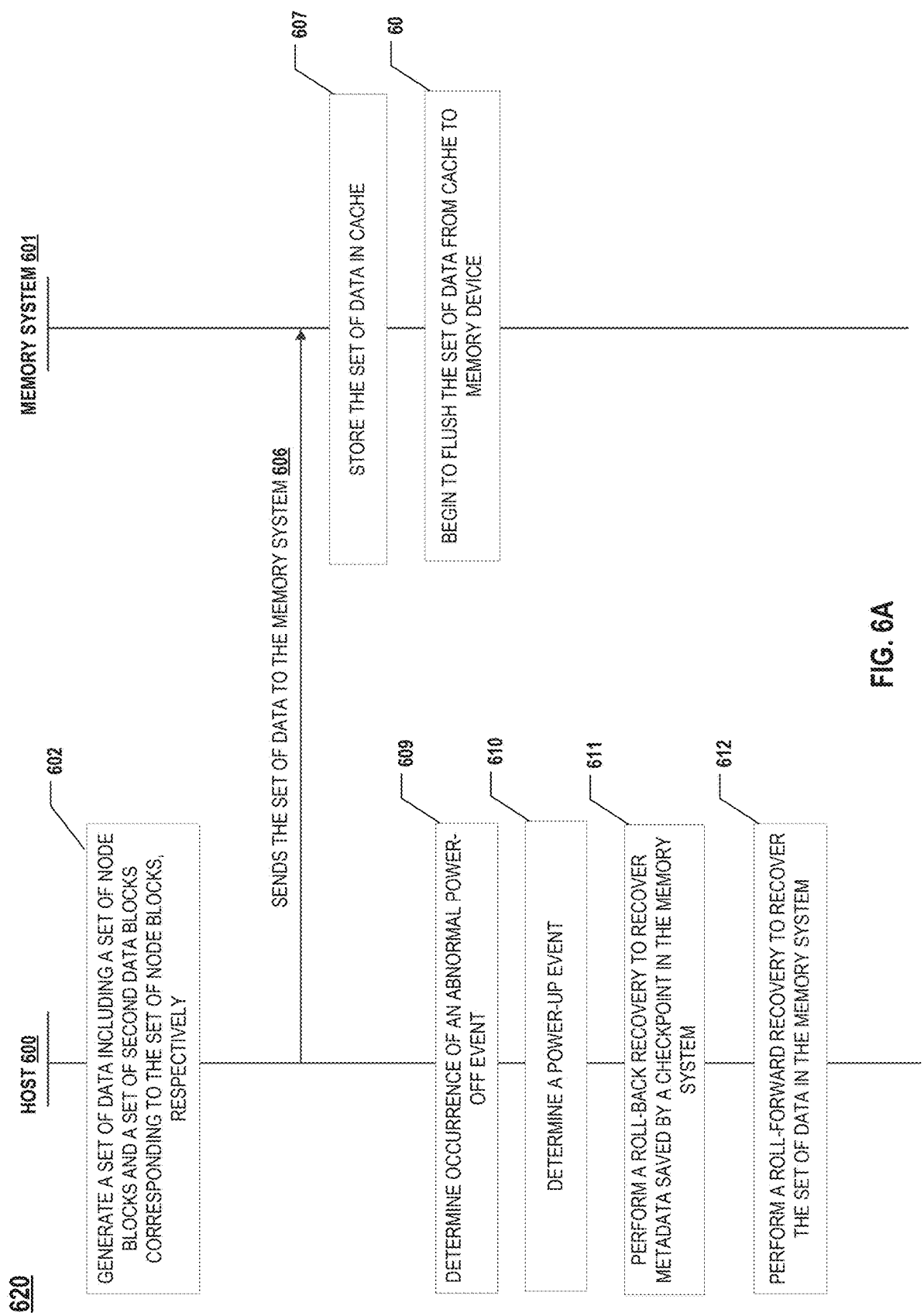

HOST, MEMORY SYSTEM, AND OPERATION METHODS THEREOF

CROSS-REFERENCE TO RELATED APPLICATIONS

This application claims the benefit of priority to Chinese Application No. 202410695128.8, filed on May 30, 2024, which is incorporated herein by reference in its entirety.

BACKGROUND

The present disclosure relates to hosts, memory systems, and operation methods thereof.

Non-volatile storage devices such as solid-state drives (SSDs), non-volatile memory express (NVMe), embedded multimedia cards (eMMCs), and universal flash storage (UFS) devices, etc., have gained significant popularity in recent years due to their numerous advantages over traditional hard disk drives (HDDs), such as faster read and write speed, durability and reliability, reduced power consumption, silent operation, and smaller form factors. For example, non-volatile storage devices such as SSDs may use NAND Flash memory for non-volatile storage.

SUMMARY

In one aspect, a host is disclosed. The host includes a memory configured to store instructions and a processor coupled to the memory. Responsive to execution of the instructions, the processor is configured to determine a power-up event after abnormal power-off. The processor is further configured to perform a roll-forward recovery for a memory system at least by: determining a set of node blocks to be recovered; and for each node block included in the set of node blocks, determining a first data block stored in the memory system based on the node block, determining whether first node address information retrieved from a metadata part of the first data block matches second node address information of the node block, and determining whether to recover the node block and the first data block in the memory system based on whether the first node address information matches the second node address information.

In some implementations, the first node address information is stored in a protection information (PI) field of the metadata part of the first data block.

In some implementations, the first node address information includes a first logical address. The second node address information includes a second logical address of the node block. To determine whether the first node address information matches the second node address information, the processor is further configured to: responsive to the first logical address being identical to the second logical address, determine that the first node address information matches the second node address information; or responsive to the first logical address being not identical to the second logical address, determine that the first node address information does not match the second node address information.

In some implementations, to determine whether to recover the node block and the first data block in the memory system, the processor is configured to: responsive to the first node address information matching the second node address information, recover the node block and the first data block in the memory system; or responsive to the first node address information not matching the second node address information, discard the node block and the first data block in the memory system.

In some implementations, prior to the abnormal power-off, the processor is configured to generate a set of data including the set of node blocks and a set of second data blocks corresponding to the set of node blocks, respectively. A set of metadata parts in the set of second data blocks includes a set of second node address information associated with the set of second data blocks, respectively.

In some implementations, for each node block, the second node address information of the node block is included in a PI field within a metadata part of a second data block corresponding to the node block.

In some implementations, the metadata part of the first data block or the second data block is implemented through a Non-Volatile Memory Express 2.0 (NVMe2.0) command or a Small Computer System Interface (SCSI) command.

In some implementations, the host further includes a storage interface communicatively coupled to the memory, the processor, and the memory system. Prior to the abnormal power-off, the storage interface is configured to send the set of data to the memory system.

In some implementations, the roll-forward recovery is configured to recover the set of data. Prior to performing the roll-forward recovery, the processor is further configured to perform a roll-back recovery to recover metadata saved by a checkpoint responsive to determining the power-up event.

In some implementations, the set of data is sent to the memory system after the checkpoint through a synchronization operation. Each node block in the set of data includes a direct node and is tagged with a synchronization flag.

In some implementations, to determine the set of node blocks, the processor is further configured to determine a set of direct nodes based on the checkpoint. Each of the set of direct nodes is tagged with the synchronization flag. The processor is further configured to determine the set of node blocks to be the set of direct nodes tagged with the synchronization flag.

In some implementations, a Flash-Friendly File System (F2FS) is implemented in the host.

In another aspect, a method is disclosed. The method includes determining a power-up event after abnormal power-off. The method further includes performing a roll-forward recovery for a memory system at least by: determining a set of node blocks to be recovered; and for each node block included in the set of node blocks, determining a first data block stored in the memory system based on the node block, determining whether first node address information retrieved from a metadata part of the first data block matches second node address information of the node block, and determining whether to recover the node block and the first data block in the memory system based on whether the first node address information matches the second node address information.

In some implementations, the first node address information is stored in a PI field of the metadata part of the first data block.

In some implementations, the first node address information includes a first logical address. The second node address information includes a second logical address of the node block. Determining whether the first node address information matches the second node address information includes: responsive to the first logical address being identical to the second logical address, determining that the first node address information matches the second node address information; or responsive to the first logical address being not identical to the second logical address, determining that the first node address information does not match the second node address information.

In some implementations, determining whether to recover the node block and the first data block in the memory system includes: responsive to the first node address information matching the second node address information, recovering the node block and the first data block in the memory system; or responsive to the first node address information not matching the second node address information, discarding the node block and the first data block in the memory system.

In some implementations, prior to the abnormal power-off, the method further includes generating a set of data including the set of node blocks and a set of second data blocks corresponding to the set of node blocks, respectively. A set of metadata parts in the set of second data blocks includes a set of second node address information associated with the set of second data blocks, respectively.

In some implementations, for each node block, the second node address information of the node block is included in a PI field within a metadata part of a second data block corresponding to the node block.

In some implementations, the metadata part of the first data block or the second data block is implemented through a NVMe2.0 command or an SCSI command.

In some implementations, the method further includes prior to the abnormal power-off, sending the set of data to the memory system.

In some implementations, the roll-forward recovery is configured to recover the set of data. Prior to performing the roll-forward recovery, the method further includes performing a roll-back recovery to recover metadata saved by a checkpoint responsive to determining the power-up event.

In some implementations, the set of data is sent to the memory system after the checkpoint through a synchronization operation. Each node block in the set of data includes a direct node and is tagged with a synchronization flag.

In some implementations, determining the set of node blocks includes: determining a set of direct nodes based on the checkpoint, where each of the set of direct nodes is tagged with the synchronization flag; and determining the set of node blocks to be the set of direct nodes tagged with the synchronization flag.

In still another aspect, a non-transitory computer-readable storage medium is disclosed. The computer-readable storage medium is configured to store instructions which, in response to an execution by a processor, cause the processor to perform a process including determining a power-up event after abnormal power-off. The process further includes performing a roll-forward recovery for a memory system at least by: determining a set of node blocks to be recovered; and for each node block included in the set of node blocks, determining a first data block stored in the memory system based on the node block, determining whether first node address information retrieved from a metadata part of the first data block matches second node address information of the node block, and determining whether to recover the node block and the first data block in the memory system based on whether the first node address information matches the second node address information.

In yet another aspect, a system including a memory system and a host is disclosed. The host includes a storage interface communicatively coupled to the memory system, a memory configured to store instructions, and a processor coupled to the storage interface and the memory. Responsive to execution of the instructions, the processor is configured to generate a set of data including a set of node blocks and a set of data blocks corresponding to the set of node blocks, respectively. Each data block includes a data part and a metadata part. A set of metadata parts associated with the set of data blocks includes a set of node address information associated with the set of node blocks, respectively. The storage interface is configured to send the set of data to the memory system.

In some implementations, for each data block, node address information of a corresponding node block is included in a PI field within the metadata part of the data block.

In some implementations, the processor is further configured to determine a power-up event after abnormal power-off. The processor is further configured to perform a roll-forward recovery for the memory system at least by: determining the set of node blocks to be recovered; and for each node block included in the set of node blocks, determining a stored data block in the memory system based on the node block, retrieving node address information from a metadata part of the stored data block, determining whether the retrieved node address information matches node address information of the node block, and determining whether to recover the node block and the stored data block in the memory system based on whether the retrieved node address information matches the node address information of the node block.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 6A illustrates a data recovery process including a roll-back recovery and a roll-forward recovery, according to some aspects of the present disclosure.

Figure 1:
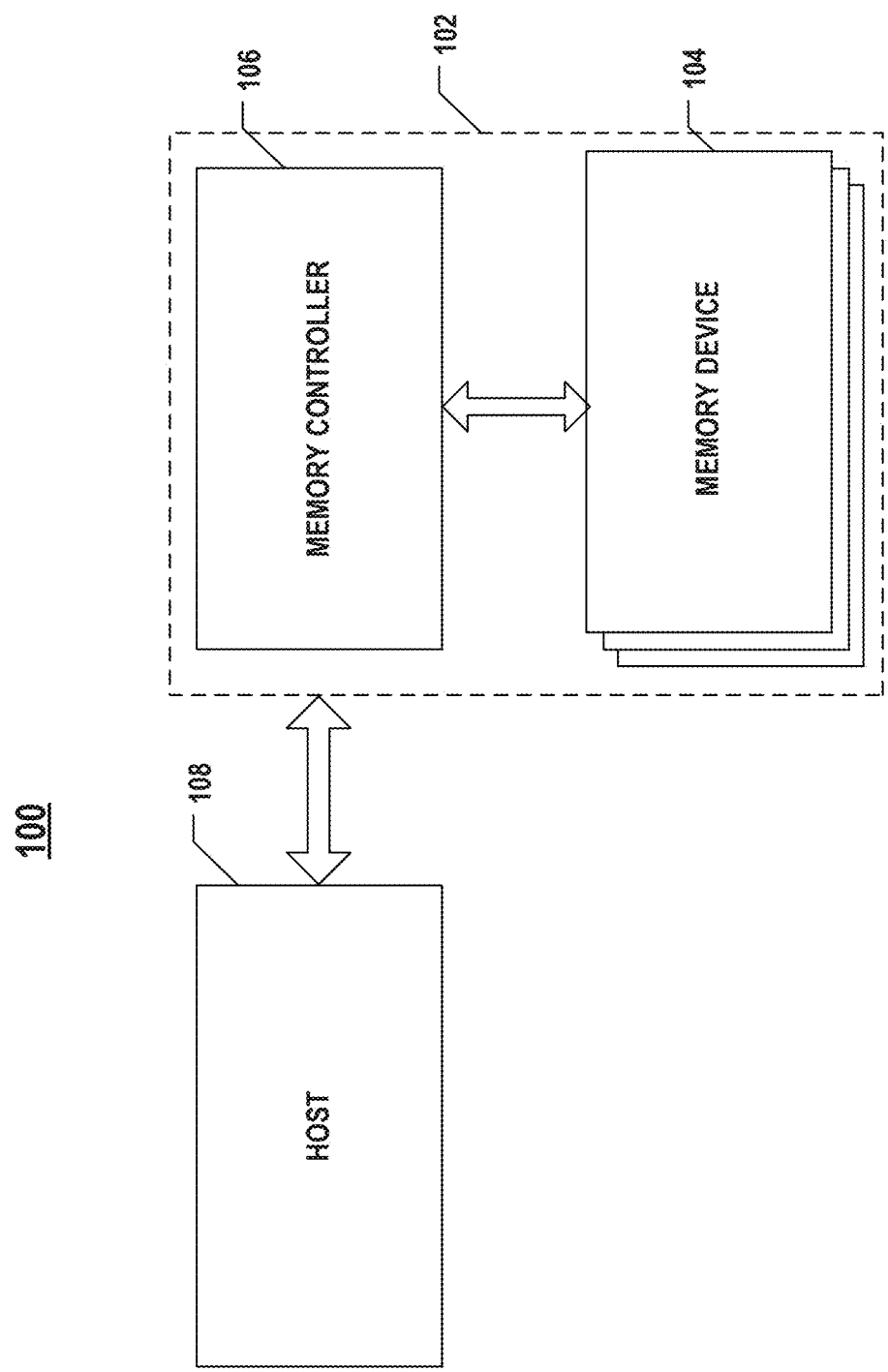
FIG. 1 illustrates a block diagram of a system having a memory device, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

F2FS is a commonly used file system for mobile phones that is currently available on the market. Many universal Flash storage (UFS) devices on mobile phones may turn on their respective write caches by default in order to improve the user experience. When an abnormal power outage event occurs, data stored in a write cache of a UFS device may be lost if the data has not been written into a Flash memory of the UFS device. The file system F2FS may need to determine whether this abnormal power outage event will cause undesirable data inconsistency issues in the UFS device. In response to determining power up after the abnormal power outage, F2FS may perform data recovery for the UFS device. For example, a roll-back recovery may be performed to recover metadata saved by a checkpoint to ensure consistency of the metadata of the file system at the checkpoint. With respect to data sent to the UFS device through a synchronization operation (fsync) after the checkpoint, a roll-forward recovery may be performed to recover the data. Because no checkpoint has been generated for the data, the roll-forward recovery of the data can be difficult.

For example, a host may send data (including a node block and an original data block corresponding to the node block) to the UFS device through a synchronization operation and store the data in a write cache of the UFS device. During a flush operation on the write cache (e.g., a flush in a synchronization operation fsync=posix or a flush after a synchronization operation fsync=no barrier as illustrated in FIG. 5B), the node block can be written from the write cache to Flash memory before the original data block. If an abnormal power outage event occurs during the flush operation, the synchronization operation is interrupted. Then, there can be a situation where the original data block is not yet written into the Flash memory due to the abnormal power outage, whereas the node block is already written into the Flash memory. In this case, the original data block corresponding to the node block is lost. When the roll-forward recovery is performed after power-on, the node block tagged with the synchronization flag may point to a stored data block in the Flash memory which is not the original data block corresponding to the node block. If the roll-forward recovery recovers the node block and the stored data block, data corruption or data inconsistency occurs in the Flash memory. Further illustration of data corruption or data inconsistency during a roll-forward recovery is provided below with reference to FIGS. 5D-5E.

To address one or more of the aforementioned issues, the present disclosure introduces a solution that incorporates direct node address information of a node block into a PI field of an original data block corresponding to the node block. The node block and the original data block may be sent from a host to a memory system for storage through a synchronization operation. If an abnormal power-off event occurs, a roll-forward recovery may be performed to recover the node block and the original data block after power-up. For example, in response to power-up, the node block, which is tagged with a synchronization flag, can be identified, and a stored data block, which is pointed to by the node block, can be retrieved from the memory system. Based on direct node address information retrieved from a PI field of the stored data block, it can be determined whether the stored data block is a valid data block for the node block. If the stored data block is valid (e.g., indicating that the stored data block is identical to the original data block), the node block and the stored data block can be recovered in the roll-forward recovery. However, if the stored data block is invalid (e.g., indicating the stored data block is not identical to the original data block), the node block and the stored data block may be discarded in the roll-forward recovery. As a result, the node block and the stored data block recovered by the roll-forward recovery are ensured to be consistent to avoid data corruption.

By applying the solution disclosed herein, data inconsistency or data corruption can be avoided in the memory system after an abnormal power-off event. Therefore, data security in the memory system can be improved.

Consistent with some aspects of the present disclosure, an original data block may be a data block generated by a host. Node address information of a node block corresponding to the original data block may be stored in a metadata part (e.g., a PI field) of the original data block, and can be referred to as original node address information (or actual node address information). A stored data block may be a data block stored in a memory system. The stored data block may be retrieved from the memory system based on a corresponding node block which includes a block address of the stored data block. Node address information stored in a metadata part (e.g., a PI field) of the stored data block may be referred to as retrieved node address information. In the present disclosure, a stored data block and an original data block may be referred to as a first data block and a second data block, respectively. The retrieved node address information from the stored data block and the actual node address information from the original data block may be referred to as first node address information and second node address information, respectively. In some implementations, a metadata part of the first data block or the second data block can be implemented through a Non-Volatile Memory Express 2.0 (NVMe2.0) command or a Small Computer System Interface (SCSI) command.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as dynamic random-access memory (DRAM) devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
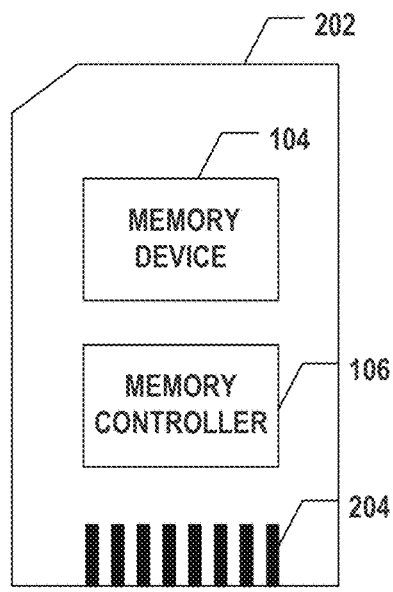
FIG. 2A illustrates a diagram of a memory card having a memory device, according to some aspects of the present disclosure.
Figure 2B:
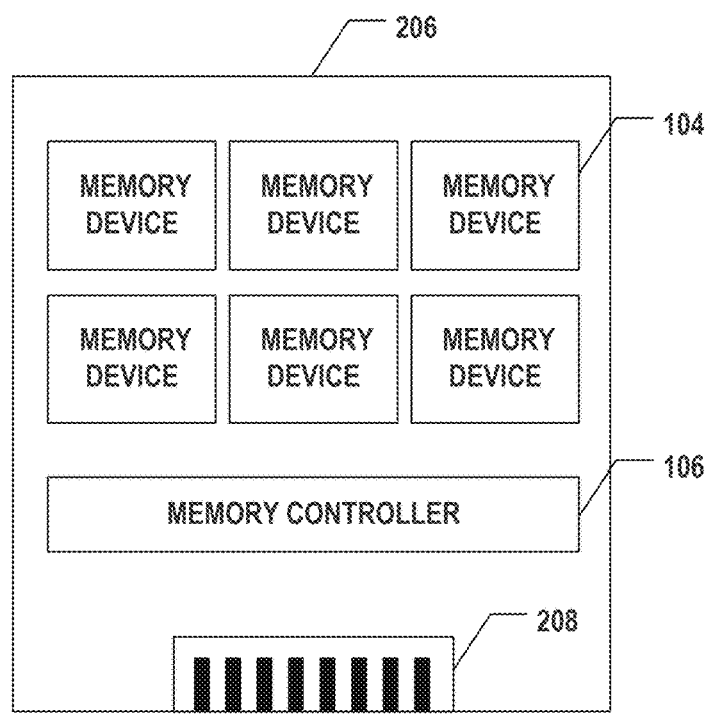
FIG. 2B illustrates a diagram of a solid-state drive (SSD) having a memory device, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
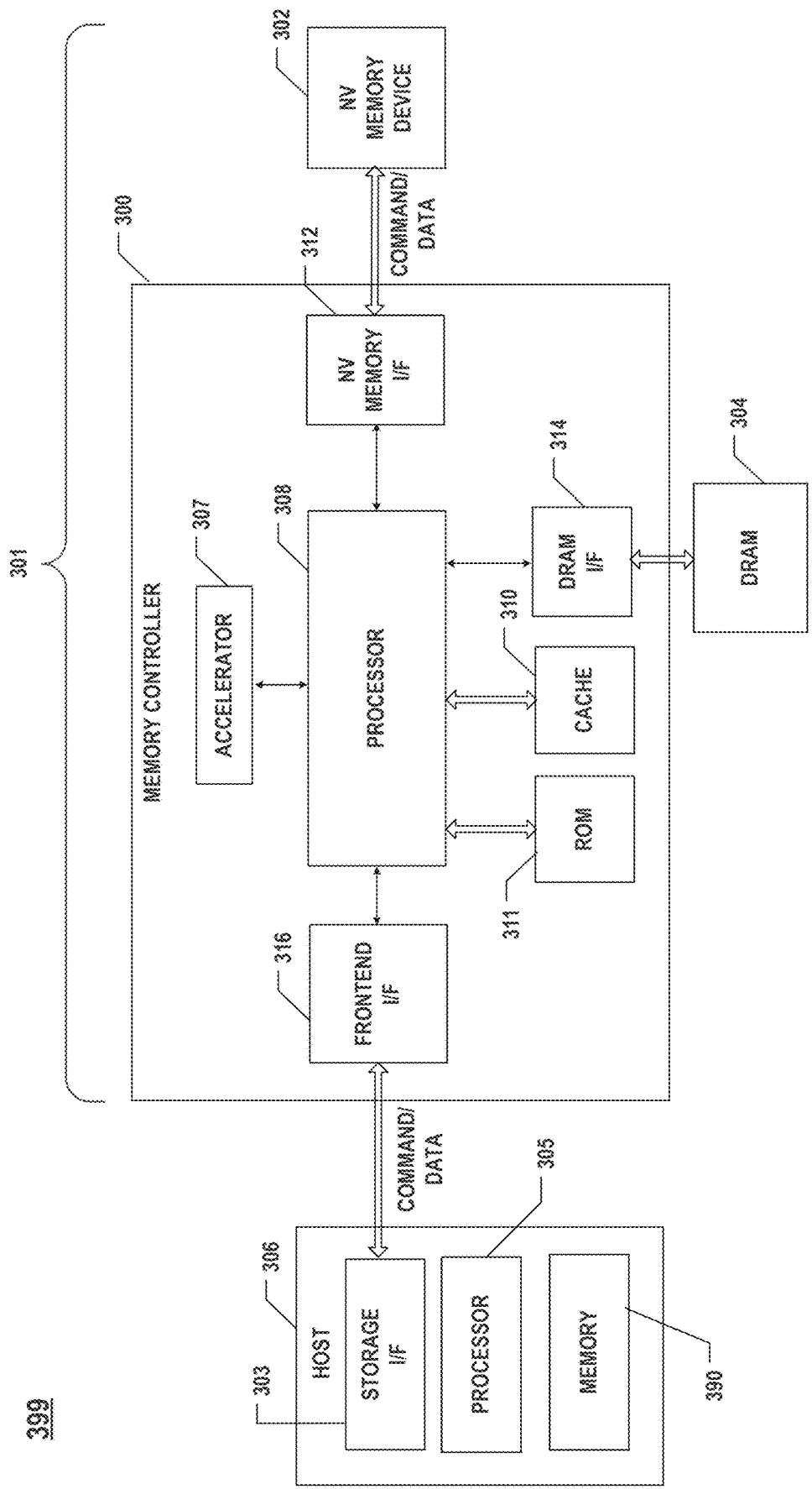
FIG. 3 illustrates another block diagram of a system having a memory device, according to some aspects of the present disclosure.

FIG. 3 illustrates another block diagram of a system 399 having a memory device, according to some aspects of the present disclosure. System 399 may be an example of system 100 in FIG. 1. System 399 may include a host 306 (e.g., an example of host 108 in FIG. 1) and a memory system 301 (e.g., an example of memory system 102 of FIG. 1). Memory system 301 may include a memory controller 300 (e.g., an example of memory controller 106 in FIG. 1) and a non-volatile memory device 302 (e.g., an example of memory device 104 in FIG. 1).

As shown in FIG. 3, memory controller 300 can include a processor 308, an accelerator 307 (e.g., a hardware accelerator), a cache 310, and a read-only memory (ROM) 311. In some implementations, processor 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processor 308. In some implementations, processor 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a non-volatile memory interface 312, a DRAM interface 314, and a frontend interface 316 operatively coupled to non-volatile memory device 302 (e.g., flash memory), DRAM 304 (e.g., an example of volatile memory devices), and host 306, respectively. Non-volatile memory interface 312, DRAM interface 314, and frontend interface 316 can be configured to transfer data, command, clock, or any suitable signals between processor 308 and non-volatile memory device 302, DRAM 304, and host 306, respectively. Non-volatile memory interface 312, DRAM interface 314, and frontend interface 316 can implement any suitable communication protocols facilitating data transfer, communication, and management, such as the NVMe protocol and PCI-E protocol, double data rate (DDR) protocol, to name a few.

As described above, both cache 310 and DRAM 304 may be considered volatile memory devices that can be controlled and accessed by memory controller 300 in a memory system. In some implementations, a cache can be implemented as part of volatile memory devices, for example, by an SRAM and/or DRAM 304. It is understood that although FIG. 3 shows that cache 310 is within memory controller 300 and DRAM 304 is outside of memory controller 300, in some examples, both cache 310 and DRAM 304 may be within memory controller 300 or outside of memory controller 300.

In some implementations, DRAM 304 and DRAM I/F 314 may be optional components of memory system 301. That is, memory system 301 may not include DRAM 304 and DRAM I/F 314 in some examples. For example, memory system 301 may include a UFS device which does not have any DRAM therein.

Host 306 may include a storage interface (I/F) 303, a processor 305, and a memory 390. Storage interface 303 may be operatively coupled to frontend interface 316 of memory controller 300. Storage interface 303 may be configured to transfer data, command, or any suitable signals between host 306 and memory controller 300. Storage interface 303 can implement any suitable communication protocols facilitating data transfer, communication, and management, such as the NVMe protocol, the PCI-E protocol, SCSI, to name a few. Processor 305 may have a structure like that of processor 308, and a similar description will not be repeated herein.

Figure 4:
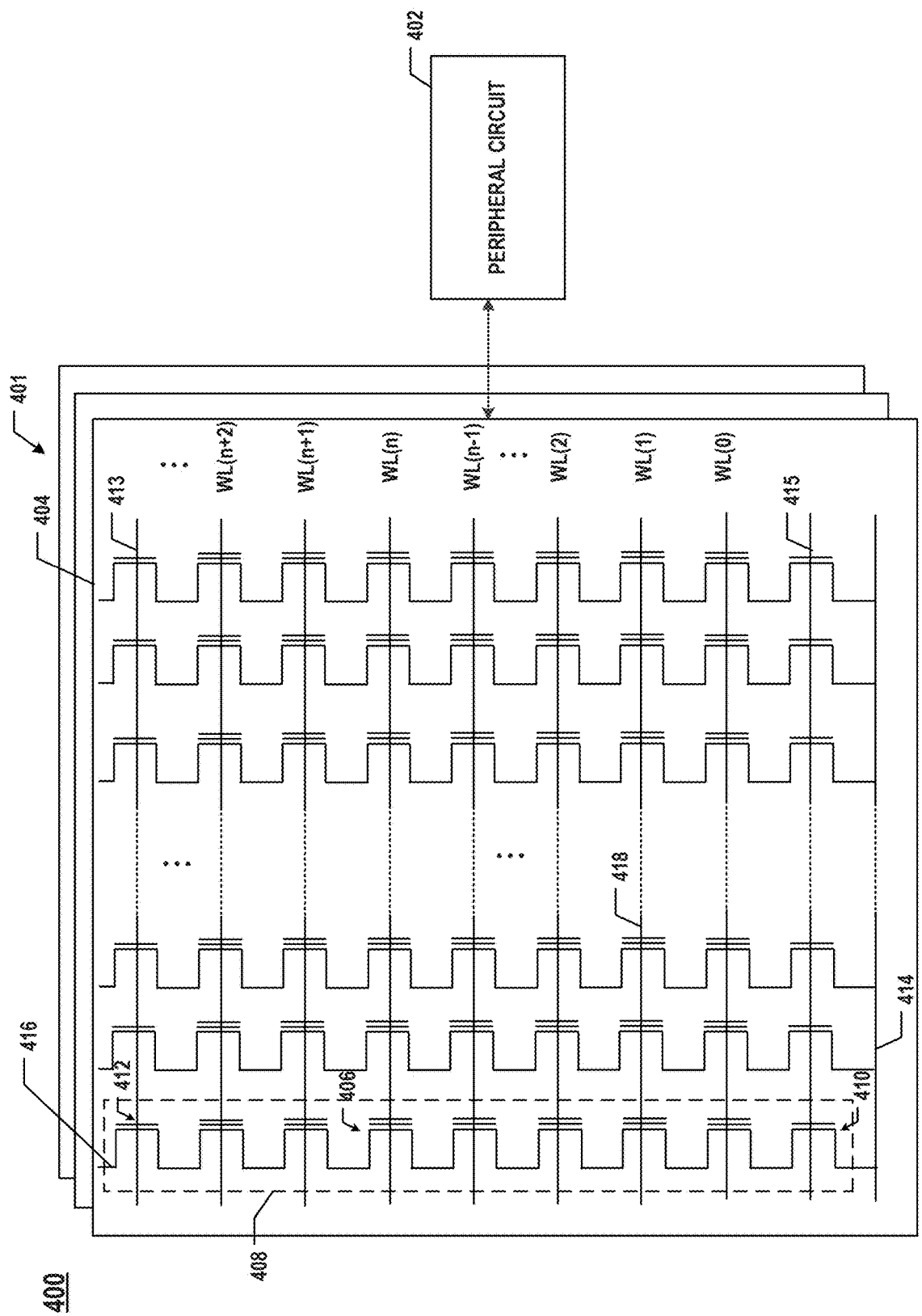
FIG. 4 illustrates a schematic diagram of a memory device including peripheral circuits, according to some aspects of the present disclosure.

FIG. 4 illustrates a schematic diagram of a memory device 400 including peripheral circuits 402, according to some aspects of the present disclosure. Memory device 400 can be an example of memory device 104 in FIG. 1 or memory device 302 of FIG. 3. Memory device 400 can include a memory cell array 401 and peripheral circuits 402 coupled to memory cell array 401. Memory cell array 401 can be a NAND Flash memory cell array in which memory cells 406 are provided in an array of NAND memory strings 408 each extending vertically above a substrate (not shown). In some implementations, each NAND memory string 408 includes a plurality of memory cells 406 coupled in series and stacked vertically. Each memory cell 406 can hold a continuous, analog value, such as an electrical voltage or charge, that depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 406 is a multi-level cell (MLC) that is capable of storing more than a single bit of data in more than four memory states. For example, the MLC can store two bits per cell, three bits per cell (also known as TLC), or four bits per cell (also known as QLC). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 4, each NAND memory string 408 can also include a source select gate (SSG) transistor 410 at its source end and a drain select gate (DSG) transistor 412 at its drain end. SSG transistor 410 and DSG transistor 412 can be configured to activate select NAND memory strings 408 (columns of the array) during read and program operations. In some implementations, the sources of NAND memory strings 408 in the same block 404 are coupled through a same source line (SL) 414, e.g., a common SL. In other words, all NAND memory strings 408 in the same block 404 have an array common source (ACS), according to some implementations. The drain of each NAND memory string 408 is coupled to a respective bit line 416 from which data can be read or written via an output bus (not shown), according to some implementations. In some implementations, each NAND memory string 408 is configured to be selected or deselected by applying a DSG select voltage or a DSG unselect voltage to the gate of respective DSG transistor 412 through one or more DSG lines 413 and/or by applying an SSG select voltage or an SSG unselect voltage to the gate of respective SSG transistor 410 through one or more SSG lines 415.

As shown in FIG. 4, NAND memory strings 408 can be organized into multiple blocks 404, each of which can have a common source line 414, e.g., coupled to an ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive voltage (e.g., 20 V or more). Memory cells 406 of adjacent NAND memory strings 408 can be coupled through word lines 418 that select which row of memory cells 406 is affected by read and program operations. Each word line 418 can include a plurality of control gates (gate electrodes) at each memory cell 406 coupled to word line 418 and a gate line coupling the control gates. With reference to FIG. 4, a plurality of word lines WL(0), WL(1), WL(2), . . . , WL(n−1), WL(n), WL(n+1), and WL(n+2) are illustrated, with n being a positive integer.

Peripheral circuits 402 can be coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each target memory cell 406 through bit lines 416, word lines 418, source lines 414, SSG lines 415, and DSG lines 413. Peripheral circuits 402 can include various types of peripheral circuits formed using metal-oxide-semiconductor (MOS) technologies. For example, peripheral circuits 402 may include a page buffer/sense amplifier, a column decoder/bit line driver, a row decoder/word line driver, a voltage generator, control logic, registers, etc.

Figure 5A:
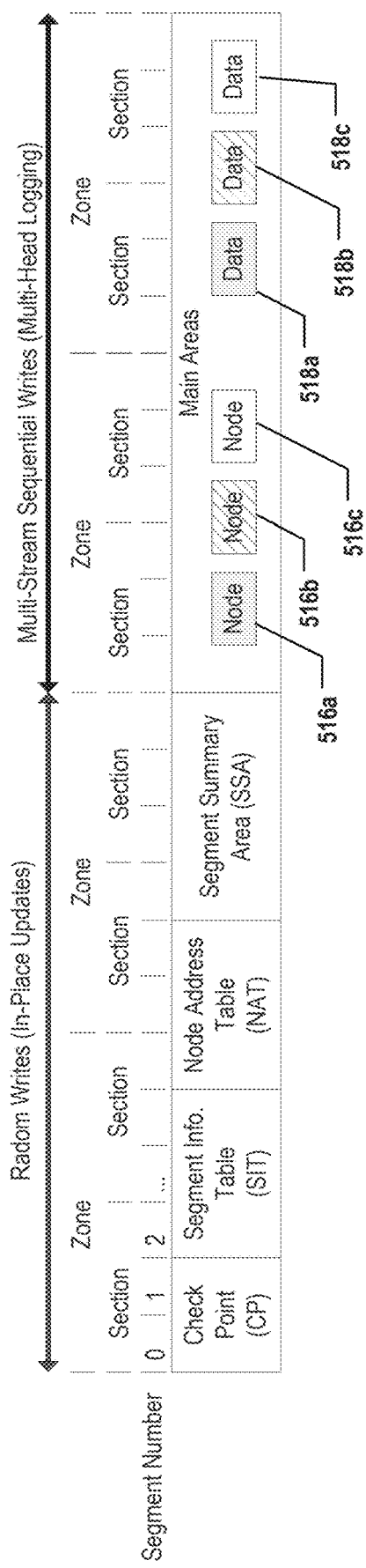
FIG. 5A illustrates an on-disk layout of a Flash-Friendly File System (F2FS), according to some aspects of the present disclosure.
Figure 5B:
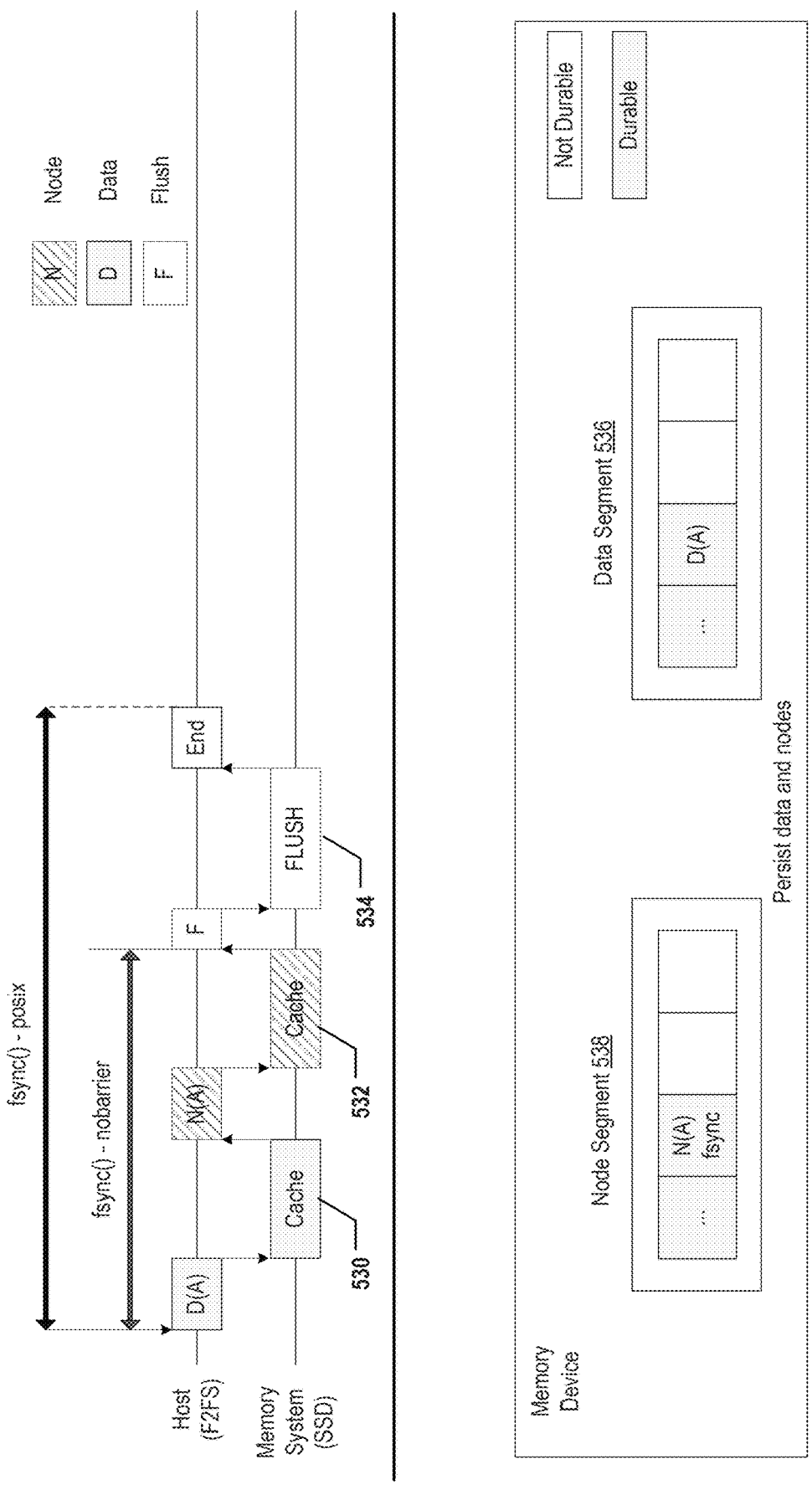
FIG. 5B illustrates a synchronization operation in an F2FS, according to some aspects of the present disclosure.

FIG. 5A illustrates an on-disk layout of F2FS, according to some aspects of the present disclosure. The on-disk data structures of F2FS are laid out to match how underlying NAND flash memory is organized and managed. As illustrated in FIG. 5A, F2FS divides the whole volume of NAND flash memory into fixed-size segments (e.g., segment 0, segment 1, segment 2, . . . ). The segment is a basic unit of management in F2FS. A section may include consecutive segments, and a zone may include a series of sections.

Data stored under F2FS may include metadata, node blocks, and data blocks. The metadata may include one or more checkpoints (CPs), a segment information table (SIT), a node address table (NAT), and a segment summary area (SSA). A checkpoint may store a file system status at a given point of time, which may act as a recovery point after a sudden power-off event. The checkpoint may keep the file system status, bitmaps for valid NAT/SIT sets, orphan inode lists, and summary entries of currently active segments. The segment information table may include per-segment information such as the number of valid blocks and the bitmap for the validity of all blocks in main areas. The node address table can be a block address table to locate all the node blocks stored in the main areas. The segment summary area stores summary entries representing the owner information of all blocks in the main areas, such as parent inode number and its node/data offsets.

The main areas can be filled with blocks (e.g., 4 KB blocks). Each block can be allocated and typed to be "node" or "data." A node block contains inode or indices of data blocks, while a data block contains either directory or user file data. A section does not store data blocks and node blocks simultaneously. Each node block has a unique identification number (e.g., a node ID). By using a corresponding node ID as an index, NAT serves the physical locations of all node blocks. A node block represents one of three types: inode, direct node, and indirect node. An inode block contains a file's metadata, such as a file name, an inode number, a file size, etc. A direct node block contains a block address of data, and an indirect node block has a node ID locating another node block.

Three node blocks 516a, 516b, and 516c are illustrated in the main areas of FIG. 5A, which correspond to three data blocks 518a, 518b, and 518c, respectively. For example, node block 516a can be a direct node block that contains a block address of data block 518a, such that data block 518a can be located through node block 516a. Similarly, node block 516b can be a direct node block that contains a block address of data block 518b, such that data block 518b can be located through node block 516b.

FIG. 5B illustrates a synchronization operation (e.g., fsync) in F2FS, according to some aspects of the present disclosure. By executing the synchronization operation fsync, a host may store a data block D(A), as well as a node block N(A) corresponding to the data block D(A), into a non-volatile memory device of a memory system. A default manner of performing the synchronization operation fsync may be denoted as fsync=posix or fsync( )–posix, and may include: (1) the host sends the data block D(A) to the memory system, causing the memory system to store the data block D(A) in a cache (e.g., storing the data block D(A) in the cache at step 530); (2) the host sends the node block N(A) to the memory system, causing the memory system to store the node block N(A) in the cache (e.g., storing the node block N(A) in the cache at step 532); and (3) the memory system may flush the data block D(A) and the node block N(A) into the non-volatile memory device (e.g., flushing the data block D(A) and the node block N(A) into the memory device at step 534). The data block D(A) may be stored in a data segment 536 of the main areas of the memory device. The node block N(A) may be tagged with a synchronization flag ("fsync") and stored in a node segment 538 of the main areas of the memory device. The default manner fsync=posix includes a flush operation within the synchronization operation, to ensure that the data block D(A) and the node block N(A) are flushed into the non-volatile memory device at the end of the synchronization operation.

Another manner of performing the synchronization operation fsync may be denoted as fsync=nobarrier or fsync( )–nobarrier (also referred to as "nobarrier manner"), and may include: (1) the host sends the data block D(A) to the memory system, causing the memory system to store the data block D(A) in a cache (e.g., storing the data block D(A) in the cache at step 530); and (2) the host sends the node block N(A) to the memory system, causing the memory system to store the node block N(A) in the cache (e.g., storing the node block N(A) in the cache at step 532). Unlike the default manner fsync=posix, the nobarrier manner does not include the flush operation within the synchronization operation, and the memory system can determine when to flush the data stored in the cache into the memory device. After the memory system flushes the data stored in the cache into the memory system, the data block D(A) may be stored in data segment 536 of the main areas of the memory device. The node block N(A) may be tagged with a synchronization flag ("fsync") and stored in node segment 538 of the main areas of the memory device.

Figure 5C:
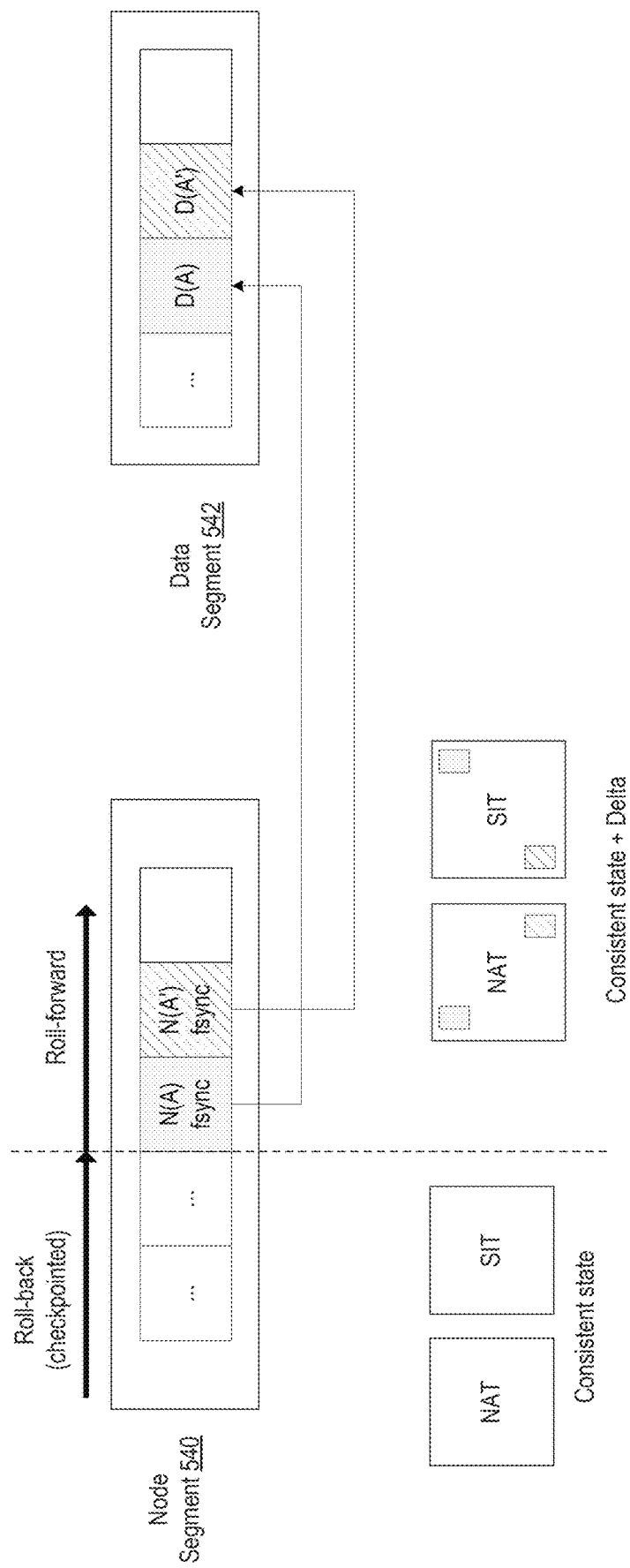
FIG. 5C illustrates a roll-forward recovery, according to some examples of the present disclosure.

FIG. 5C illustrates a roll-forward recovery, according to some examples of the present disclosure. Responsive to a power-up event after abnormal power-off, F2FS may roll back to the latest consistent checkpoint. For example, a roll-back recovery may be performed to recover metadata (e.g., NAT, SIT, etc.) saved by the latest checkpoint. Afterwards, a roll-forward recovery may be performed. For example, node blocks labeled with the synchronization flag ("fsync"), such as N(A) and N(A') may be determined from a node segment 540. The node blocks N(A) and N(A') can be direct node blocks. Based on a block address stored in the node block N(A), a data block D(A) corresponding to the node block N(A) can be located in a data segment 542. Similarly, based on a block address stored in the node block N(A'), a data block D(A') corresponding to the node block N(A') can be located in data segment 542. Then, the pair of node block N(A) and data block D(A) can be recovered by updating the NAT and the SIT based on the node block N(A) and data block D(A). Similarly, the pair of node block N(A') and data block D(A') can be recovered by updating the NAT and the SIT based on the node block N(A') and data block D(A'). Subsequently, a new checkpoint can be generated to save the latest metadata including the updated NAT and the updated SIT.

Figure 5D:
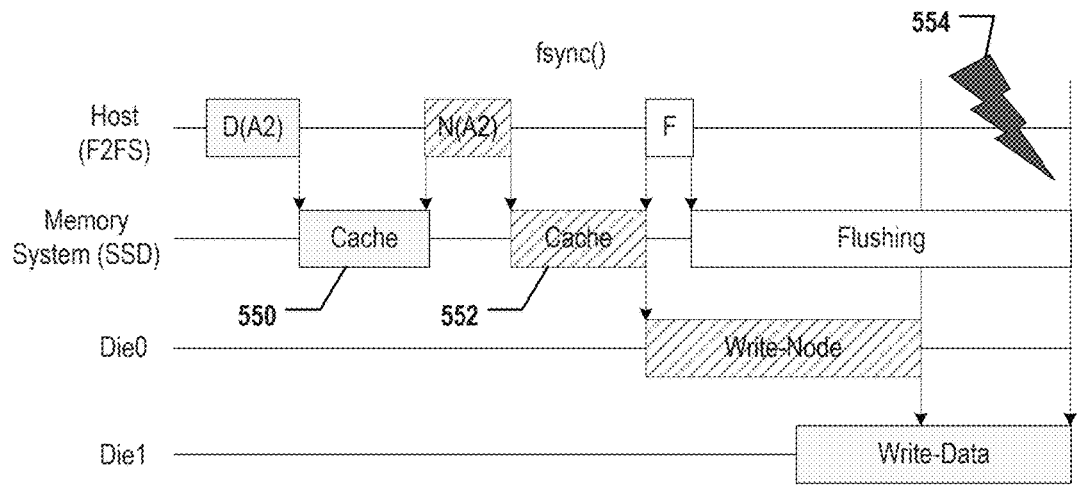
FIGS. 5D-5E illustrate occurrence of an abnormal power-off event during a synchronization operation, according to some examples of the present disclosure.
Figure 5E:
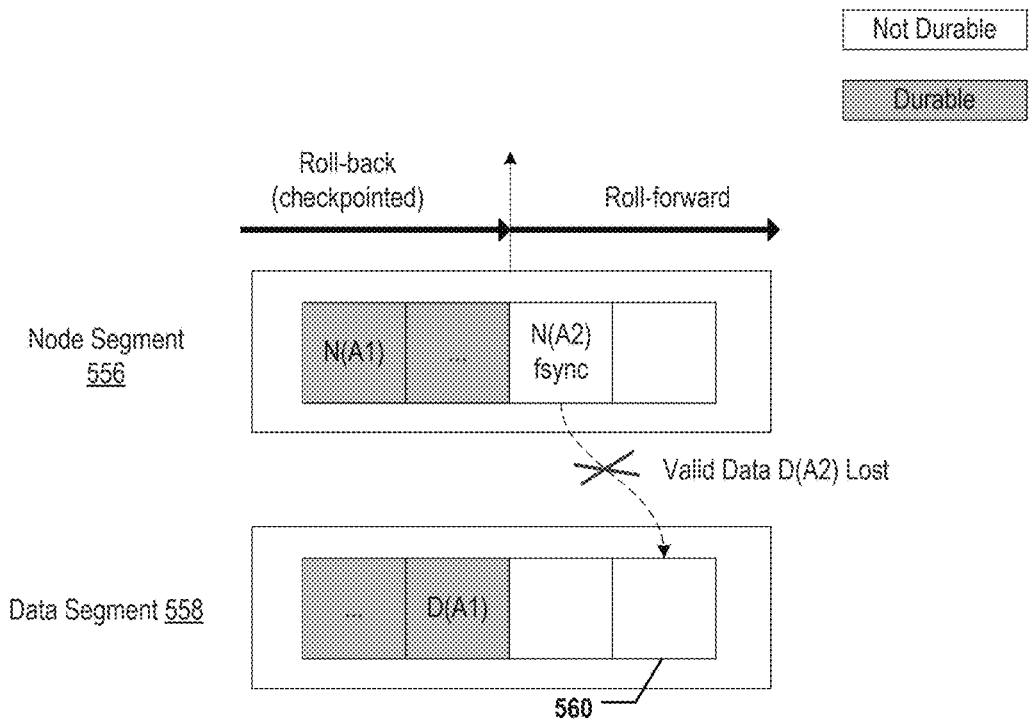

FIGS. 5D-5E illustrate occurrence of an abnormal power-off event during a synchronization operation, according to some examples of the present disclosure. FIGS. 5D-5E are described together. Through the synchronization operation fsync, a host may intend to store a data block D(A2), as well as a node block N(A2) corresponding to the data block D(A2), into a non-volatile memory device of a memory system. The default manner fsync=posix may be used to perform the synchronization operation. For example, the host sends the data block D(A2) to the memory system, causing the memory system to store the data block D(A2) in a cache (e.g., caching the data block D(A2) at step 550). The host sends the node block N(A2) to the memory system, causing the memory system to store the node block N(A2) in the cache (e.g., caching the node block N(A2) at step 552). Then, the memory system may flush the node block N(A2) into a first die Die0 of the non-volatile memory device and the data block D(A2) into a second die Die1 of the non-volatile memory device. An abnormal power-off event 554 occurs after the flushing of the node block N(A2) into the first die Die0. However, the flushing of the data block D(A2) into the second die Die1 is not completed yet when abnormal power-off event 554 occurs. Then, the node block N(A2) is saved in a node segment 556 of Die0, whereas the data block D(A2) is lost due to the abnormal power-off (e.g., not saved in a block address pointed to by the node block N(A2)).

Afterward, responsive to a power-up event, a roll-back recovery may be performed to recover metadata saved by the latest checkpoint. For example, a node block N(A1) and its corresponding data block D(A1) are already checkpointed, and their corresponding metadata can be recovered by the roll-back recovery.

After the roll-back recovery, a roll-forward recovery may be performed on node blocks and data blocks that are not checkpointed yet. For example, the node block N(A2) labeled with the synchronization flag ("fsync") may be determined from node segment 556. Based on the block address stored in the node block N(A2), a data block 560 can be located in a data segment 558. The node block N(A2) and data block 560 may be recovered by the roll-forward recovery. However, due to the abnormal power-off, the original data block D(A2) is not saved in the block address pointed to by the node block N(A2), causing data block 560 located by the node block N(A2) to be an invalid data block (e.g., data block 560 is different from the original data block D(A2)). For example, data block 560 is an old data block which is not yet erased and updated to be the original data block D(A2) due to the abnormal power-off event. In another example, data block 560 is an empty data block which is not yet updated to be the original data block D(A2) due to the abnormal power-off event. As a result, data corruption (or data inconsistency) occurs when the node block N(A2) and data block 560 are recovered by the roll-forward recovery.

An intuitive user experience in this type of data inconsistency is that a user considers the data stored in the memory system to be correct, but the data is actually invalid, and no error is reported. For example, the user may transfer a video file to the memory system, and the operating system prompts that the transfer is completed. However, when the operating system restarts after an abnormal power outage, the user may find that the data in the video file has been corrupted and the video file cannot be played.

Various solutions can be used to address the data inconsistency issue. In a first example, at default, a write cache of the memory system is considered to follow a first-in-first-out (FIFO) rule (e.g., FIFO persistence into NAND flash memory). If FIFO persistence is ensured, a data block that is saved in the write cache before its corresponding node block will be persisted into the NAND flash memory before the node block. As a result, the data inconsistency problem discussed above can be avoided. However, in practice, the sequential update of the write cache to the NAND flash memory cannot be guaranteed in some memory devices of mainstream manufacturers. As a result, if FIFO persistence is not followed, the data inconsistency issue remains unsolved.

In a second example, by using an atomic write mechanism, a large number of flush operations may be performed after each data update. This method may alleviate the above data inconsistency issue, but the large number of flush operations may cause performance degradation and greatly deteriorate the user experience.

In a third example, for zoned namespace (ZNS) devices, since there is a write pointer used to indicate the location of a data block, some algorithms can be used to ensure that only valid node block and data block are restored. However, such solutions are not effective for non-ZNS memory devices.

In a fourth example, the write cache can be turned off. In this case, the above data inconsistency issue can be avoided. However, the turning off of the write cache has a great impact on the system performance. This method is only suitable for a few scenarios that are very insensitive to performance. It is not realistic for most consumer application scenarios and enterprise application scenarios.

Different from the above first to fourth examples, a solution is disclosed herein to incorporate direct node address information of a node block into a PI field of a corresponding data block, so that the node block and the corresponding data block recovered by a roll-forward recovery are ensured to be valid to avoid the data inconsistency issue. For example, in NVMe2.0, 16 bytes in a metadata part of a data block can be used to store PI information. The PI information includes a storage tag, and the length of the storage tag is configurable from 2 bytes to 8 bytes. To perform a synchronization operation, a host may store a direct node address of a node block corresponding to an original data block in a storage tag of a PI field of the original data block. The host may send the node block and the original data block to the memory system for storage through the synchronization operation, with the node block being tagged with a synchronization flag. When a roll-forward recovery is performed for the memory system, the host may identify the node block tagged with the synchronization flag from the memory system, and locate a stored data block from the memory system based on the node block. The host may then query a storage tag of a PI filed of the stored data block to retrieve a direct node address from the storage tag. If the direct node address retrieved from the stored data block is identical to the actual direct node address of the node block, the host may determine that the stored data block is the same as the original data block (e.g., the stored data block is valid). The host may recover the pair of the node block and the stored data block in the roll-forward recovery. Otherwise (e.g., if the direct node address retrieved from the stored data block is different from the actual direct node address of the node block), the host may determine that the stored data block is invalid (e.g., the stored data block is different from the original data block). The host may discard the pair of the node block and the stored data block in the roll-forward recovery. Then, the host may resend the node block and the original data block to the memory system for storage again. Detailed implementations of the solution disclosed herein are illustrated below with reference to FIGS. 6A-10.

By applying the solution disclosed herein, data inconsistency or data corruption can be avoided in the memory system after the abnormal power-off event. Data security in the memory system can be improved. Unlike the above first to fourth examples, which may degrade the system performance significantly, the solution disclosed herein only has a slight influence on the system performance. For example, the solution disclosed herein may query a PI field of a stored data block during the roll-forward recovery, which may take additional time compared with the roll-forward recovery illustrated in FIG. 5C. However, compared with the performance downgrade of the first to fourth examples discussed above, this additional time cost is relatively low. For example, a user may not accept the loss of a file or an image on a client device due to data corruption after the abnormal power-off event, but the user may accept a slightly longer time to restart the client device after the abnormal power-off event.

FIG. 6A illustrates a data recovery process 620 including a roll-back recovery and a roll-forward recovery, according to some aspects of the present disclosure. Data recovery process 620 may be performed by a host 600, a memory system 601, or both. Memory system 601 can be any memory system disclosed herein, such as memory system 102 of FIG. 1 or memory system 301 of FIG. 3. Host 600 can be communicatively coupled to memory system 601. Host 600 can be any host disclosed herein, such as host 108 of FIG. 1 or host 306 of FIG. 3. F2FS may be implemented in host 600. It is understood that the operations shown in process 620 may not be exhaustive and that other operations can be performed as well before, after, or between any of the illustrated operations. Further, some of the operations may be performed simultaneously, or in a different order than shown in FIG. 6A.

Figure 7A:
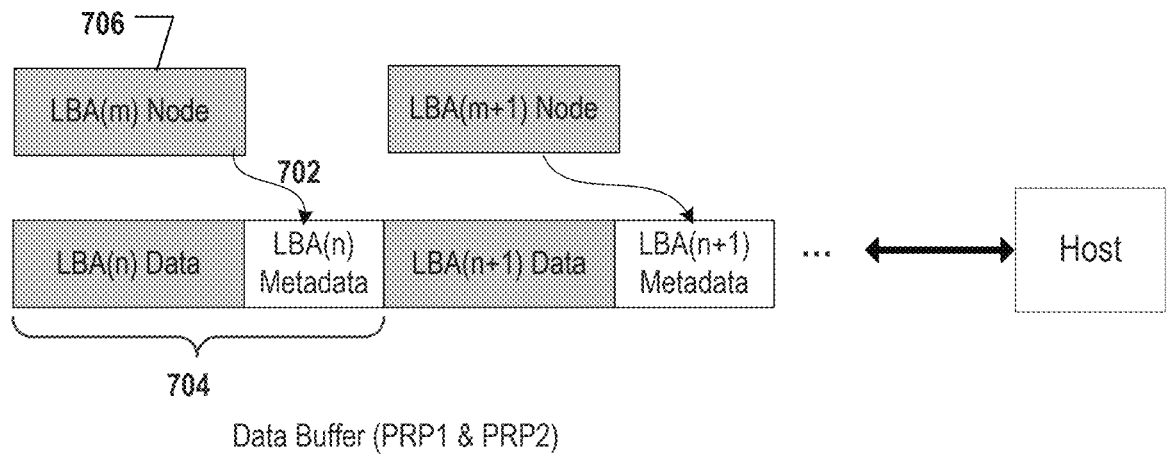
FIG. 7A illustrates data blocks each including a metadata part, according to some aspects of the present disclosure.
Figure 7B:
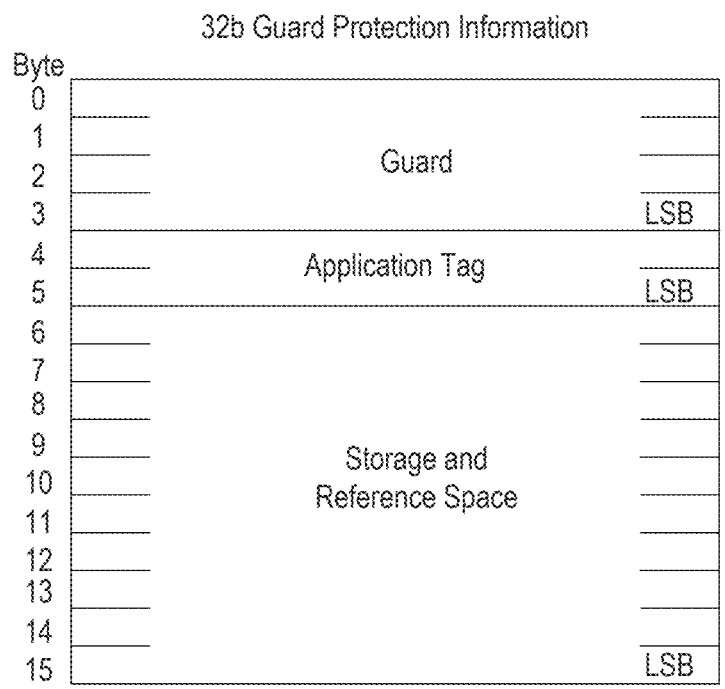
FIG. 7B illustrates protection information (PI) included in a metadata part, according to some aspects of the present disclosure.

Process 620 may begin with operation 602 in which host 600 (e.g., a processor of host 600) may generate a set of data. The set of data may include a set of node blocks and a set of second data blocks (e.g., original data blocks) corresponding to the set of node blocks, respectively. For example, the set of node blocks may include one or more node blocks, and the set of second data blocks may include one or more second data blocks corresponding to the one or more node blocks, respectively. Each second data block may include a data part and a metadata part. A set of metadata parts in the set of second data blocks may include a set of second node address information associated with the set of node blocks, respectively. For example, a second data block may correspond to a node block, and may include a metadata part that includes the second node address information (e.g., actual node address information) of the node block. In other words, for each node block in the set of node blocks, the second node address information of the node block can be included in a PI field within a metadata part of a second data block corresponding to the node block. An example of a data block and a PI field in the data block is illustrated in FIGS. 7A-7B.

Process 620 may proceed to operation 606, in which host 600 (e.g., a storage interface of host 600) may send the set of data to memory system 601. For example, host 600 may send the set of data to memory system 601 through a synchronization operation. The set of data can be sent to memory system 601 after a checkpoint. Each node block in the set of data may include a direct node and may be tagged with a synchronization flag.

Process 620 may proceed to operation 607, in which memory system 601 may receive the set of data from host 600 and may store the set of data in a cache.

Process 620 may proceed to operation 608, in which memory system 601 may begin to flush the set of data from the cache to a non-volatile memory device of memory system 601. In some implementations, an abnormal power-off event may occur during the flushing of the set of data from the cache to the memory device. In this case, there may not be enough time to flush all the node blocks and all the second data blocks from the cache to the memory device. For example, one or more node blocks, one or more second data blocks, or both, may be lost due to the abnormal power-off event. Similar to the example shown in FIGS. 5D-5E above, a node block may be already flushed from the cache to the memory device, whereas a second data block corresponding to the node block is not yet flushed from the cache to the memory device and is lost due to the abnormal power-off event.

Process 620 may proceed to operation 609, in which host 600 (e.g., the processor of host 600) may determine the occurrence of the abnormal power-off event.

Process 620 may proceed to operation 610 in which host 600 (e.g., the processor of host 600) may determine a power-up event.

Process 620 may proceed to operation 611 in which host 600 (e.g., the processor of host 600) may perform a roll-back recovery to recover metadata saved by a checkpoint in memory system 601.

Process 620 may proceed to operation 612 in which host 600 (e.g., the processor of host 600) may perform a roll-forward recovery to recover the set of data in memory system 601. An example process for performing the roll-forward recovery at operation 612 is described below with reference to FIG. 6B.

Figure 6B:
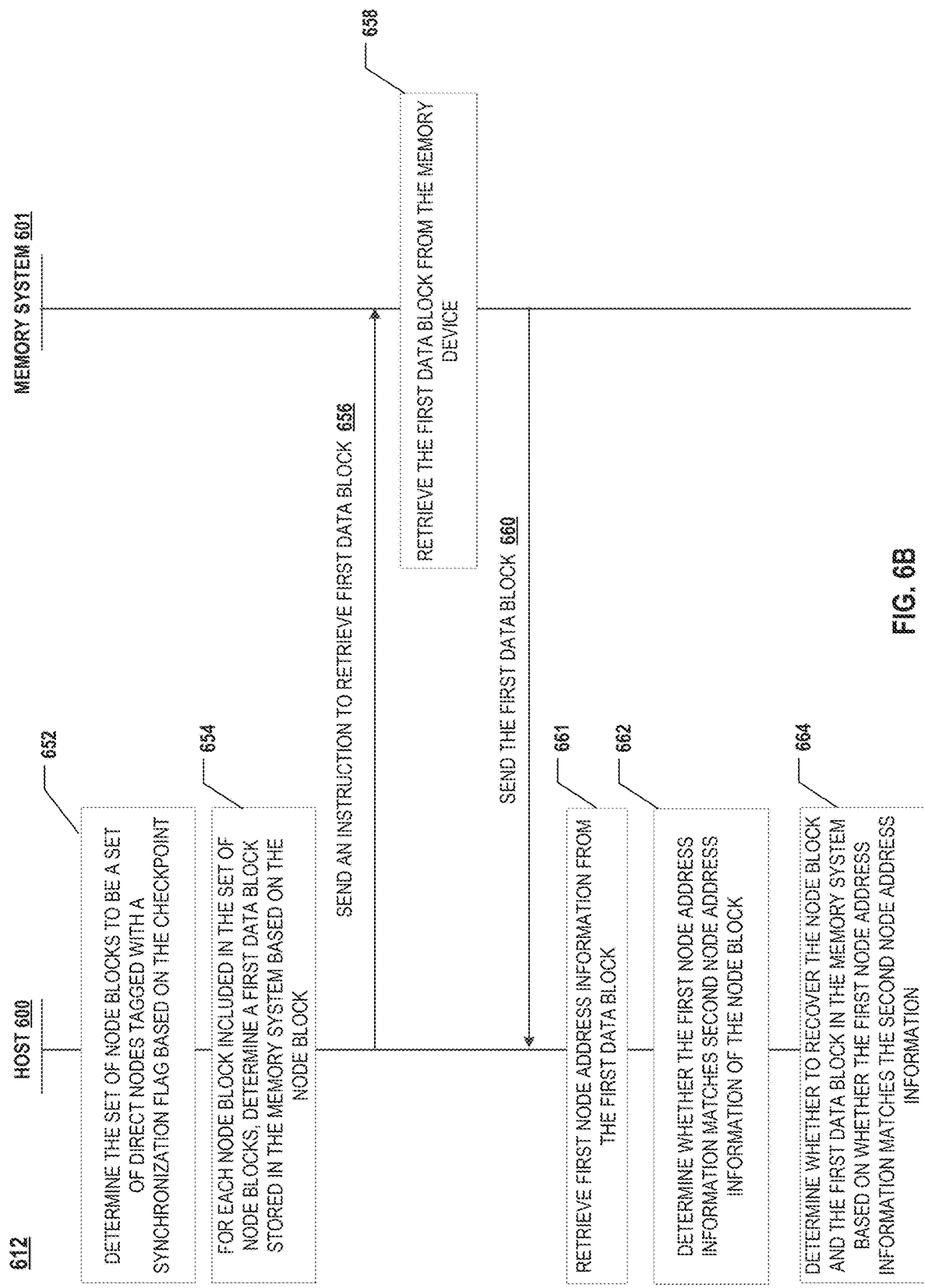
FIG. 6B illustrates the roll-forward recovery of FIG. 6A, according to some aspects of the present disclosure.

FIG. 6B illustrates the roll-forward recovery of FIG. 6A, according to some aspects of the present disclosure. It is understood that the operations shown in FIG. 6B may not be exhaustive, and other operations can be performed as well before, after, or between any of the illustrated operations. Further, some of the operations may be performed simultaneously, or in a different order than shown in FIG. 6B.

At operation 652, host 600 may determine a set of node blocks to be recovered by the roll-forward recovery. For example, host 600 may determine the set of node blocks to be a set of direct nodes based on a checkpoint, where each of the set of direct nodes is tagged with a synchronization flag. In another example, the set of node blocks includes one or more node blocks, each of which is sent to memory system 601 through a synchronization operation after the checkpoint and tagged with a synchronization flag.

At operation 654, for each node block included in the set of node blocks, host 600 may determine a first data block stored in memory system 601 (e.g., a stored data block) based on the node block. For example, host 600 may locate the first data block in memory system 601 based on a block address stored in the node block (e.g., the first data block may be pointed to by the node block in memory system 601).

At operation 656, host 600 may send an instruction to memory system 601 to retrieve the first data block.

At operation 658, memory system 601 may retrieve the first data block from a memory device of memory system 601. For example, memory system 601 may retrieve the first data block from the block address pointed to by the node block.

At operation 660, memory system 601 may send the first data block to host 600.

At operation 661, host 600 may retrieve first node address information from the first data block. For example, host 600 may retrieve first node address information from a PI field of a metadata part of the first data block.

At operation 662, host 600 may determine whether the first node address information matches second node address information of the node block. For example, the retrieved first node address information may include a first logical address. The second node address information may be actual node address information of the node block, and may include a second logical address (e.g., an actual logical address) of the node block. Host 600 may determine whether the first logical address is identical to the second logical address. Responsive to the first logical address being identical to the second logical address, host 600 may determine that the first node address information matches the second node address information. In this case, the first data block is the same as the second data block. That is, the first data block in memory system 601 is already updated to be the second data block before the abnormal power-off event.

Or, responsive to the first logical address being different from the second logical address, host 600 may determine that the first node address information does not match the second node address information. In this case, the first data block is different from the second data block. For example, the first data block is an old data block which is not yet erased and updated to be the second data block due to the abnormal power-off event. In another example, the first data block is an empty data block which is not yet updated to be the second data block due to the abnormal power-off event.

At operation 664, host 600 may determine whether to recover the node block and the first data block in the memory system based on whether the first node address information matches the second node address information. Specifically, responsive to the first node address information matching the second node address information, host 600 may recover the node block and the first data block in memory system 601. For example, host 600 may update the NAT and SIT based on the node block and the first data block. Or, responsive to the first node address information not matching the second node address information, host 600 may discard the node block and the first data block in memory system 601. Host 600 may resend the node block and a second data block corresponding to the node block to memory system 601 through a synchronization operation.

It is contemplated that operations 654, 656, 658, 660, 661, 662, and 664 may be performed for each node block included in the set of node blocks.

FIG. 7A illustrates data blocks, each including a metadata part, according to some aspects of the present disclosure. For example, a data block 704 at a logical block address LBA(n) may include a data part (e.g., LBA(n) Data) and a metadata part (e.g., LBA(n) Metadata). A node block 706 at a logical block address LBA(m) may correspond to data block 704. For example, node block 706 may store a block address LBA(n) of data block 704. Then, node address information of node block 706, which includes the logical block address LBA(m) of node block 706, can be stored in the metadata part of data block 704, as illustrated by an arrow 702. For example, the logical block address LBA(m) of node block 706 can be stored in a storage tag of a PI field within the metadata part of data block 704.

FIG. 7B illustrates a PI field included in a metadata part, according to some aspects of the present disclosure. The PI field may include a guard field, an application tag, a storage tag, and a reference space. The application tag and the storage tag can be configured by a user. Node address information of a node block can be stored in a storage tag of a corresponding data block.

Figure 8:
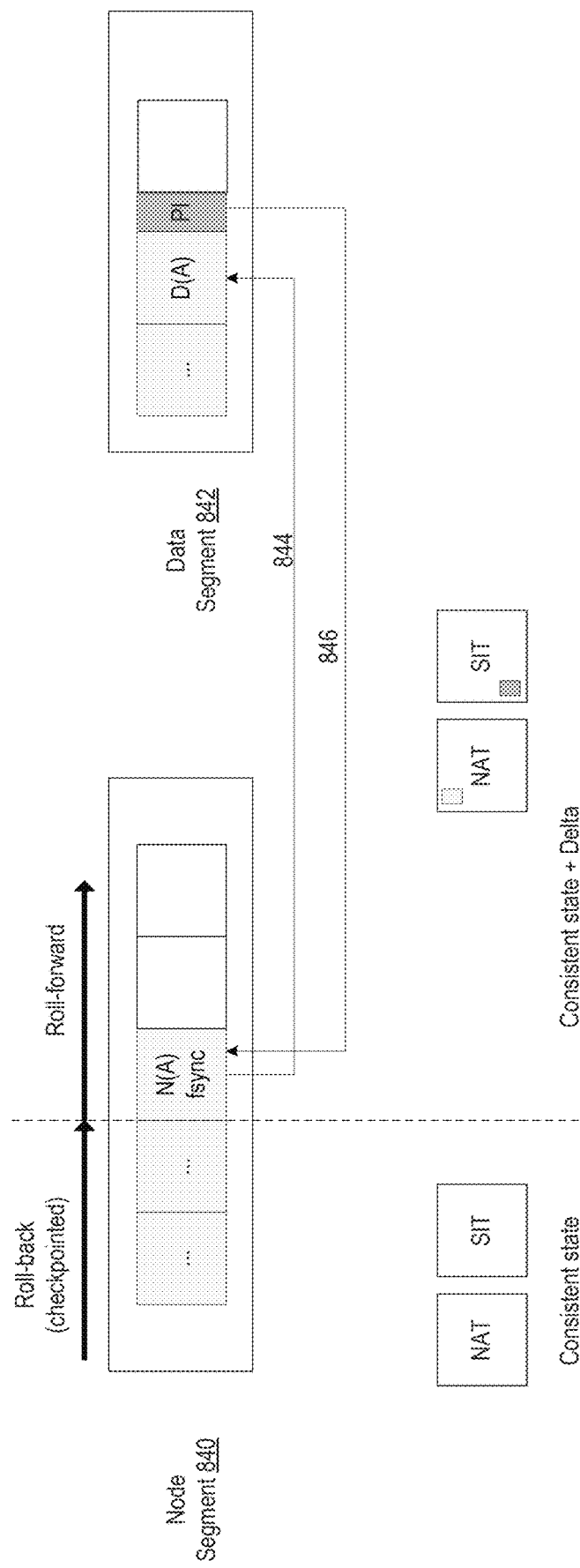
FIG. 8 illustrates a roll-forward recovery, according to some aspects of the present disclosure.

FIG. 8 illustrates a roll-forward recovery, according to some aspects of the present disclosure. Responsive to a power-up event after abnormal power-off, a roll-back recovery may be performed to recover metadata (e.g., NAT, SIT, etc.) saved by the latest checkpoint. Subsequently, a roll-forward recovery may be performed. For example, node blocks labeled with a synchronization flag ("fsync") such as N(A) may be determined from a node segment 840. The node block N(A) can be a direct node block. Based on a block address stored in the node block N(A), a stored data block D(A) corresponding to the node block N(A) can be located in a data segment 842, as illustrated by an arrow 844. Next, the stored data block D(A) may be retrieved from data segment 842 by a host, and then, node address information stored in a PI field of the stored data block D(A) can be retrieved. Then, the retrieved node address information from the PI field of the stored data block D(A) can be compared to the actual node address information of the node block N(A), as illustrated by an arrow 846, to determine whether the retrieved node address information matches the actual node address information.

If the retrieved node address information matches the actual node address information, it is determined that the stored data block D(A) is identical to an original data block corresponding to the node block N(A). Then, the pair of node block N(A) and the stored data block D(A) can be recovered by updating the NAT and the SIT based on the node block N(A) and the stored data block D(A). A new checkpoint can be generated to save the latest metadata (including the updated NAT and SIT).

Alternatively, if the retrieved node address information does not match the actual node address information, it is determined that the stored data block D(A) is not identical to the original data block corresponding to the node block N(A). Then, the pair of node block N(A) and the stored data block D(A) is not recovered and may be discarded. The host may resend the node block N(A) and the original data block corresponding to the node block N(A) to the memory system again.

Figure 9:
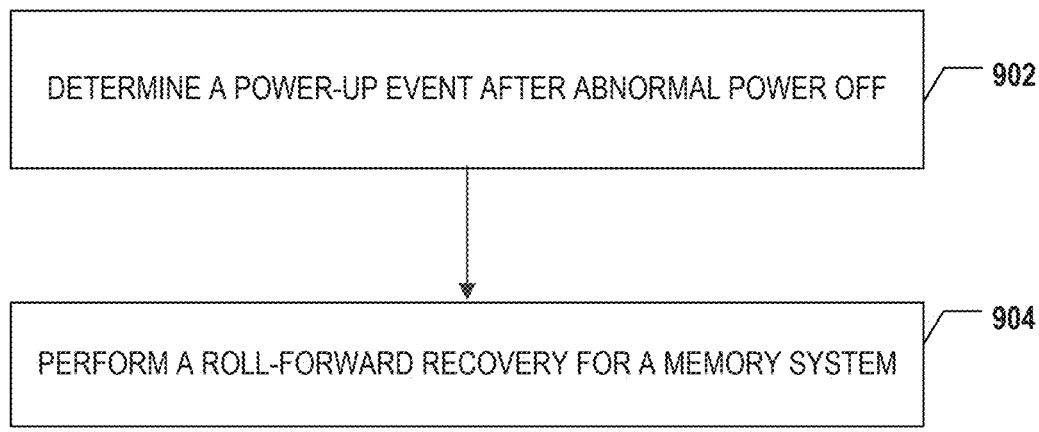
FIG. 9 illustrates a flowchart of a method for operating a host, according to some aspects of the present disclosure.

FIG. 9 illustrates a flowchart of a method 900 for operating a host, according to some aspects of the present disclosure. The host may be any suitable host disclosed herein, such as host 108, 306, or 600. Method 900 may be implemented by components of the host (e.g., processor 305 of host 306). It is understood that the operations shown in method 900 may not be exhaustive and that other operations can be performed as well before, after, or between any of the illustrated operations. Further, some of the operations may be performed simultaneously, or in a different order than shown in FIG. 9.

Referring to FIG. 9, method 900 starts at operation 902, in which a power-up event is determined after an abnormal power-off.

Method 900 proceeds to operation 904, as illustrated in FIG. 9, in which a roll-forward recovery is performed for a memory system coupled to the host. An example implementation of operation 904 is illustrated below with reference to FIG. 10.

Figure 10:
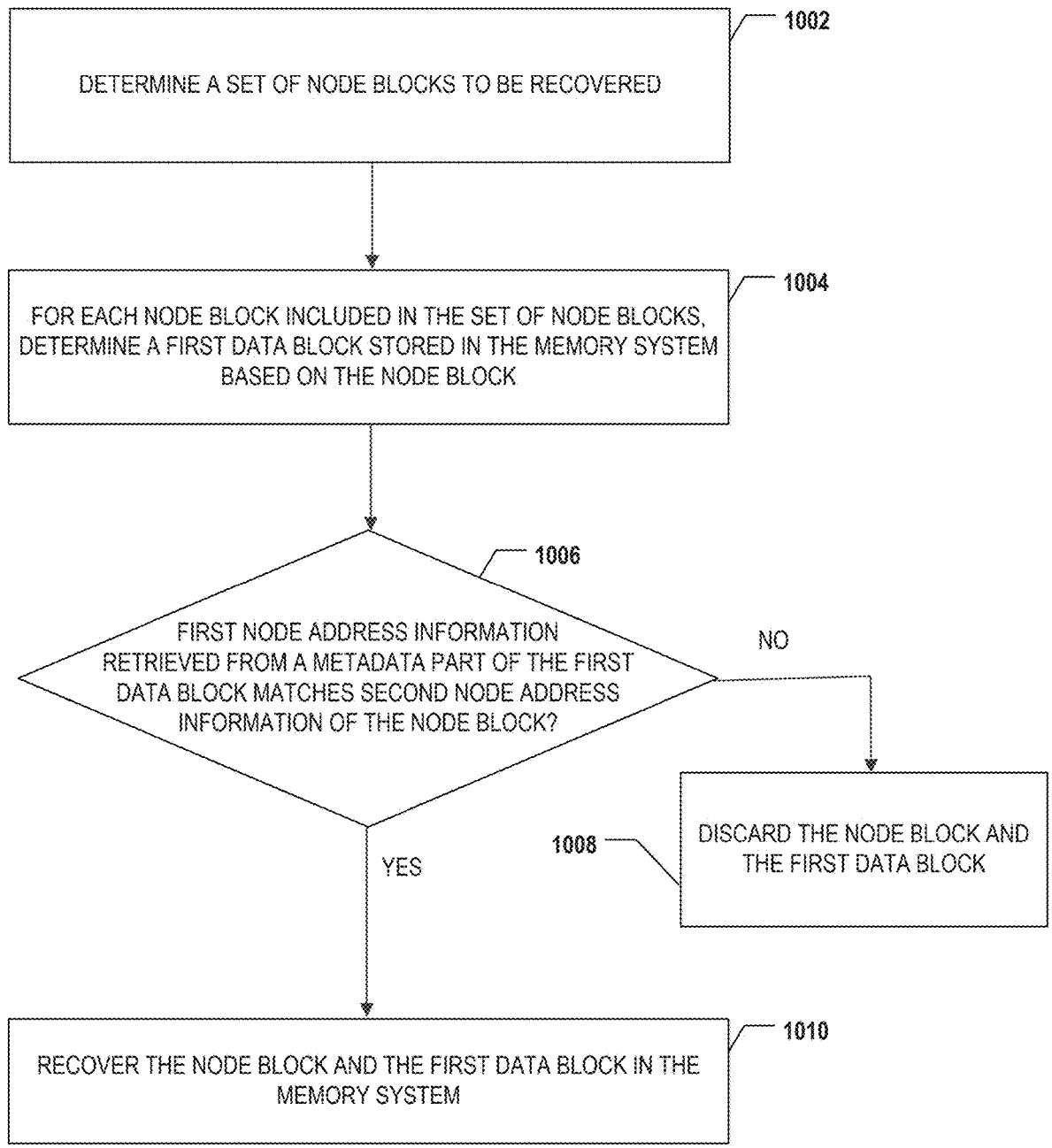
FIG. 10 illustrates a flowchart of a method for performing a roll-forward recovery, according to some aspects of the present disclosure.

FIG. 10 illustrates a flowchart of a method 1000 for performing a roll-forward recovery, according to some aspects of the present disclosure. Method 1000 may be implemented by components of a host (e.g., processor 305 of host 306). The host may be any suitable host disclosed herein, such as host 108, 306, or 600. It is understood that the operations shown in method 1000 may not be exhaustive and that other operations can be performed as well before, after, or between any of the illustrated operations. Further, some of the operations may be performed simultaneously, or in a different order than shown in FIG. 10.

Referring to FIG. 10, method 1000 starts at operation 1002, in which a set of node blocks to be recovered in a memory system is determined. The set of node blocks may include one or more node blocks.

Method 1000 proceeds to operation 1004, as illustrated in FIG. 10, in which for each node block included in the set of node blocks, a first data block stored in the memory system is determined based on the node block. For example, the first data block can be a data block stored in the memory system and pointed to by the node block.

Method 1000 proceeds to operation 1006, as illustrated in FIG. 10, in which it is determined whether first node address information retrieved from a metadata part of the first data block matches second node address information of the node block. Responsive to the first node address information matches the second node address information, method 1000 may proceed to operation 1010. Otherwise, method 1000 may proceed to operation 1008.

For example, the first node address information can be retrieved from the metadata part of the first data block. The second node address information can be the actual node address information of the node block. It is determined whether the retrieved first node address information matches the actual node address information. If the retrieved first node address information matches the actual node address information, method 1000 proceeds to operation 1010. Otherwise, method 1000 proceeds to operation 1008.

At operation 1008, the node block and the first data block are discarded in the memory system. At operation 1010, the node block and the first data block are recovered in the memory system. It is contemplated that operations 1004, 1006, 1008, and 1010 may be performed for each node block included in the set of node blocks.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A host, comprising:
a memory configured to store instructions; and
a processor coupled to the memory, wherein responsive to execution of the instructions, the processor is configured to:
determine a power-up event after abnormal power-off; and
perform a roll-forward recovery for a memory system at least by:
determining a set of node blocks to be recovered; and
for each node block included in the set of node blocks,
determining a first data block stored in the memory system based on the node block;
determining whether first node address information retrieved from a metadata part of the first data block matches second node address information of the node block; and
determining whether to recover the node block and the first data block in the memory system based on whether the first node address information matches the second node address information.

2. The host of claim 1, wherein the first node address information is stored in a protection information (PI) field of the metadata part of the first data block.

3. The host of claim 1, wherein the first node address information comprises a first logical address, the second node address information comprises a second logical address of the node block, and to determine whether the first node address information matches the second node address information, the processor is further configured to:
responsive to the first logical address being identical to the second logical address, determine that the first node address information matches the second node address information; or
responsive to the first logical address being not identical to the second logical address, determine that the first node address information does not match the second node address information.

4. The host of claim 1, wherein to determine whether to recover the node block and the first data block in the memory system, the processor is configured to:
responsive to the first node address information matching the second node address information, recover the node block and the first data block in the memory system; or
responsive to the first node address information not matching the second node address information, discard the node block and the first data block in the memory system.

5. The host of claim 1, wherein prior to the abnormal power-off, the processor is configured to:
generate a set of data comprising the set of node blocks and a set of second data blocks corresponding to the set of node blocks, respectively,
wherein a set of metadata parts in the set of second data blocks comprises a set of second node address information associated with the set of node blocks, respectively.

6. The host of claim 5, wherein for each node block, the second node address information of the node block is included in a protection information (PI) field within a metadata part of a second data block corresponding to the node block.

7. The host of claim 6, wherein the metadata part of the first data block or the second data block is implemented through a Non-Volatile Memory Express 2.0 (NVMe2.0) command or a Small Computer System Interface (SCSI) command.

8. The host of claim 5, further comprising a storage interface communicatively coupled to the memory, the processor, and the memory system,
wherein prior to the abnormal power-off, the storage interface is configured to send the set of data to the memory system.

9. The host of claim 5, wherein:
the roll-forward recovery is configured to recover the set of data; and
prior to performing the roll-forward recovery, the processor is further configured to perform a roll-back recovery to recover metadata saved by a checkpoint responsive to determining the power-up event.

10. The host of claim 9, wherein the set of data is sent to the memory system after the checkpoint through a synchronization operation, and each node block in the set of data comprises a direct node and is tagged with a synchronization flag.

11. The host of claim 10, wherein to determine the set of node blocks, the processor is further configured to:
determine a set of direct nodes based on the checkpoint, wherein each of the set of direct nodes is tagged with the synchronization flag; and
determine the set of node blocks to be the set of direct nodes tagged with the synchronization flag.

12. The host of claim 1, wherein a Flash-Friendly File System (F2FS) is implemented in the host.

13. A method, comprising:
  determining a power-up event after abnormal power-off; and
  performing a roll-forward recovery for a memory system at least by:
    determining a set of node blocks to be recovered; and
    for each node block included in the set of node blocks,
      determining a first data block stored in the memory system based on the node block;
      determining whether first node address information retrieved from a metadata part of the first data block matches second node address information of the node block; and
      determining whether to recover the node block and the first data block in the memory system based on whether the first node address information matches the second node address information.

14. The method of claim 13, wherein the first node address information is stored in a protection information (PI) field of the metadata part of the first data block.

15. The method of claim 13, wherein the first node address information comprises a first logical address, the second node address information comprises a second logical address of the node block, and determining whether the first node address information matches the second node address information comprises:
  responsive to the first logical address being identical to the second logical address, determining that the first node address information matches the second node address information; or
  responsive to the first logical address being not identical to the second logical address, determining that the first node address information does not match the second node address information.

16. The method of claim 13, wherein determining whether to recover the node block and the first data block in the memory system comprises:
  responsive to the first node address information matching the second node address information, recovering the node block and the first data block in the memory system; or
  responsive to the first node address information not matching the second node address information, discarding the node block and the first data block in the memory system.

17. The method of claim 13, wherein prior to the abnormal power-off, the method further comprises:
  generating a set of data comprising the set of node blocks and a set of second data blocks corresponding to the set of node blocks, respectively,
  wherein a set of metadata parts in the set of second data blocks comprises a set of second node address information associated with the set of node blocks, respectively.

18. The method of claim 17, wherein for each node block, the second node address information of the node block is included in a protection information (PI) field within a metadata part of a second data block corresponding to the node block.

19. The method of claim 13, wherein determining the set of node blocks comprises:
  determining a set of direct nodes based on a checkpoint, wherein each of the set of direct nodes is tagged with a synchronization flag; and
  determining the set of node blocks to be the set of direct nodes tagged with the synchronization flag.

20. A non-transitory computer-readable storage medium configured to store instructions which, in response to an execution by a processor, cause the processor to perform a process comprising:
  determining a power-up event after abnormal power-off; and
  performing a roll-forward recovery for a memory system at least by:
    determining a set of node blocks to be recovered; and
    for each node block included in the set of node blocks,
      determining a first data block stored in the memory system based on the node block;
      determining whether first node address information retrieved from a metadata part of the first data block matches second node address information of the node block; and
      determining whether to recover the node block and the first data block in the memory system based on whether the first node address information matches the second node address information.

* * * * *